Jan. 25, 1938.  H. WAGNER  2,106,418
CAR VENTILATOR
Filed Feb. 4, 1936
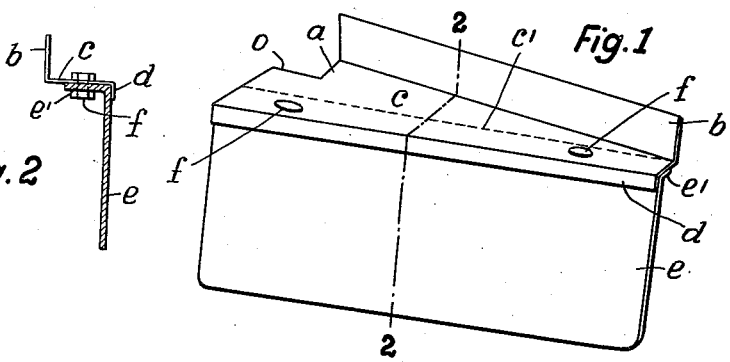
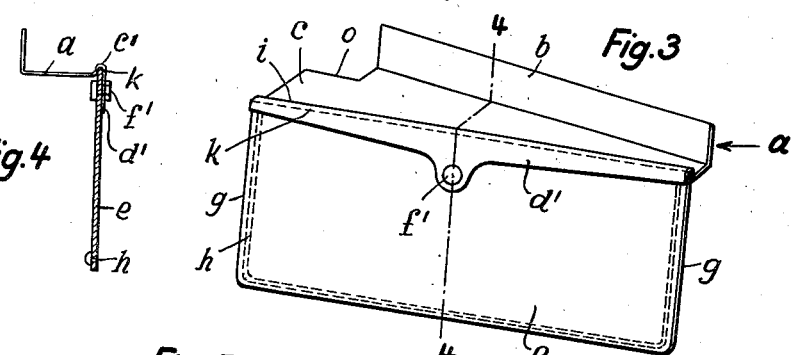
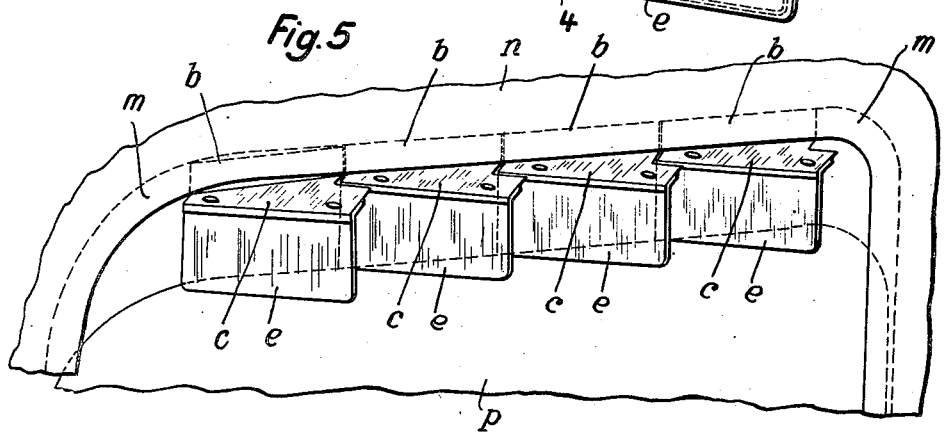
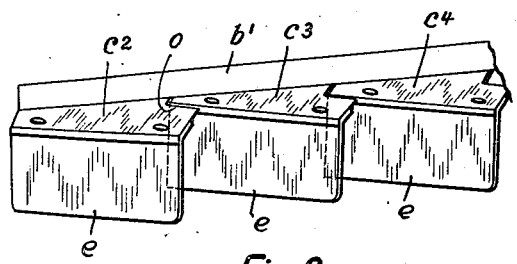
INVENTOR:
H. Wagner
by Glascock Downing & Seebold
ATTORNEYS Patented Jan. 25, 1938

2,106,418

UNITED STATES PATENT OFFICE 2,106,418

CAR VENTILATOR

Hans Wagner, Magdeburg, Germany

Application February 4, 1936, Serial No. 62,355
In Germany April 3, 1935

1 Claim. (Cl. 98—2)

My invention relates to improvements in car ventilators, and more particularly in car ventilators of the type comprising laths or louvers provided at the upper member of the window frame and arranged so that the foul air is drawn from the car by the draught caused by the moving vehicle. The object of the improvements is to provide a ventilator of this type in which the laths or louvers are constructed so that they may be used in window frames of different shape, and more particularly in window frames in which the upper frame member is inclined or curved. With this object in view my invention consists in constructing the lath or louver members which are loosely arranged one beside the other from a supporting member which is adapted to be secured to the window frame, and which is substantially Z-shaped in cross-section and comprises a triangular portion disposed substantially perpendicularly to the plane of the window, an upwardly directed flange adapted to be fixed to the upper frame member, and a downwardly directed flange which has the laths or louvers proper secured thereto.

Other objects of the improvements will appear from the following description.

For the purpose of explaining the invention several examples embodying the same have been shown in the accompanying drawing in which the same reference characters have been used in all the views to indicate corresponding parts. In said drawing, Fig. 1 is a perspective view showing one of the louver members of the ventilating device, Fig. 2 is a sectional elevation taken on the line 2—2 of Fig. 1, Fig. 3 is a perspective view similar to the one illustrated in Fig. 1 and showing a modification of the lath or louver member, Fig. 4 is a sectional elevation taken on the line 4—4 of Fig. 3, Fig. 5 is a fragmentary perspective view showing the top part of the window of a motor vehicle having the louvers fixed thereto, and Fig. 6 is a fragmentary perspective view showing a modification.

In the construction shown in Figs. 1 and 2 the ventilating device comprises a set of lath or louver members each composed of a supporting member $a$, preferably made from sheet metal and a lath or louver $e$ preferably made from glass or other transparent material such as celluloid, cellon or the like. The supporting member $a$ is substantially Z-shaped in cross-section, and it comprises a substantially triangular portion $c$ located when applied to the window substantially perpendicularly thereto, an upwardly directed flange $b$ adapted to be fixed within the groove of the upper window frame member, and a downwardly directed flange $d$ which by reason of the triangular shape of the portion $c$ is disposed angularly of the plane of the window. The lath or louver $e$ is fixed to the flange $d$ in any suitable way. In the example shown in Figs. 1 and 2 the louver $e$ is formed at its top with a flange $e'$ which is fixed to the portion $c$ by means of two screws or rivets $f$ while the supporting member $a$ is made from comparatively thin and strong material, it is preferred to make the louver or lath $e$ with a comparatively thick wall. Thus the thin supporting member may be fixed with its flange $b$ to one of the side walls of the groove of the window frame in which the pane of the window is guided, and it does not interfere with the proper movement of the said pane into and out of the said groove. Where the louvers $e$ or laths are made from flexible and transparent material I prefer to reinforce the same along their margins $g$, for example by pressing thereon a comparatively thick margin, or by pressing a groove $h$ into the same along the margin $g$, as is shown in Figs. 3 and 4. I have found that thereby the transparency of the louver is not interfered with.

In Figs. 3 and 4, I have shown a modification in which the Z-shaped supporting member $a$ is formed at its outer margin with a groove $i$ which opens downwardly, and which is adapted to receive the upper margin of the louver $e$, the said upper margin being securely held within the said groove. The downwardly directed flange $d'$ of the supporting member $a$ covers the upper margin $k$ of the louver from the outside, and the said louver is fixed to the flange by means of a rivet $f'$ located at the middle of the flange, the said rivet fitting loosely in the bore of the louver $e$ so that the said louver is fixed in position without undue strain. By thus constructing the louver and its supporting member distortion by tension of the louver is prevented. The louver members may be made in any size, but preferably they are comparatively short in length, so that they adapt themselves to any curved shape of the window frame.

In Fig. 5, I have shown the manner of mounting the louver members in the frame $n$ of a window of a motor vehicle. As is shown in the said figure the louver members are disposed one beside the other, and they are disconnected from one another. The upwardly directed flange $b$ of the supporting members $a$ engage in the groove $m$ in which the window pane $p$ is guided, and preferably the said flanges are clamped between one of the side walls of the said groove and the packing strip, a suitable cement being preferably applied to the flange $b$ for securely holding the same in position. By reason of the thin flange $b$ the width of the groove $m$ is not materially reduced, so that the pane may be completely closed if desired.

In Fig. 6, I have shown a modification which may be used where the window frames are straight. As shown in the said figure the upwardly directed flanges $b'$ of the supporting members are made integral, the said supporting members comprising a continuous flange $b'$ carrying the portions $c^2$, $c^3$, $c^4$, and the said flange is likewise fitted within the groove of the window frame.

In the constructions shown in the figures the louvers partly overlap one another, the apex of each triangular portion $c^3$, $c^4$, etc., extending into cut-out portions $o$ of the portions $c$ of the adjacent supporting members.

The louver members may be disposed on the window frame in continuous arrangement. But by the construction shown in the figures in which adjacent louvers overlap one another draught within the vehicle is prevented.

I claim:

Ventilating means for windows of closed automobiles comprising a series of brackets each including a main portion of substantially triangular configuration, the inner edge of the base of which is provided with a recess for receiving with a tight fit the apex of the adjacent main portion so that the several main portions form a continuous closed surface for arrangement along the upper part of the frame of a window and conforming to the curvature of the window frame, an attaching flange integral with the inner edge of the main portion and adapted to be secured to the window frame in such a manner that the main portion of the bracket extends laterally from the window and exteriorly of the automobile, the outer edge of each main portion being inclined toward the front of the automobile, a louver member depending from the main portion of each bracket and positioned adjacent and substantially parallel to each inclined outer edge of the said main portion, said louver members being so positioned that when the automobile is in motion a current of air passing over the surfaces thereof creates a vacuum at the open outer ends to exhaust used air from the interior of the automobile.

HANS WAGNER.